March 8, 1927.
M. J. WHELAN
BOWLING PIN
Filed March 27, 1922
1,620,310
2 Sheets-Sheet 1
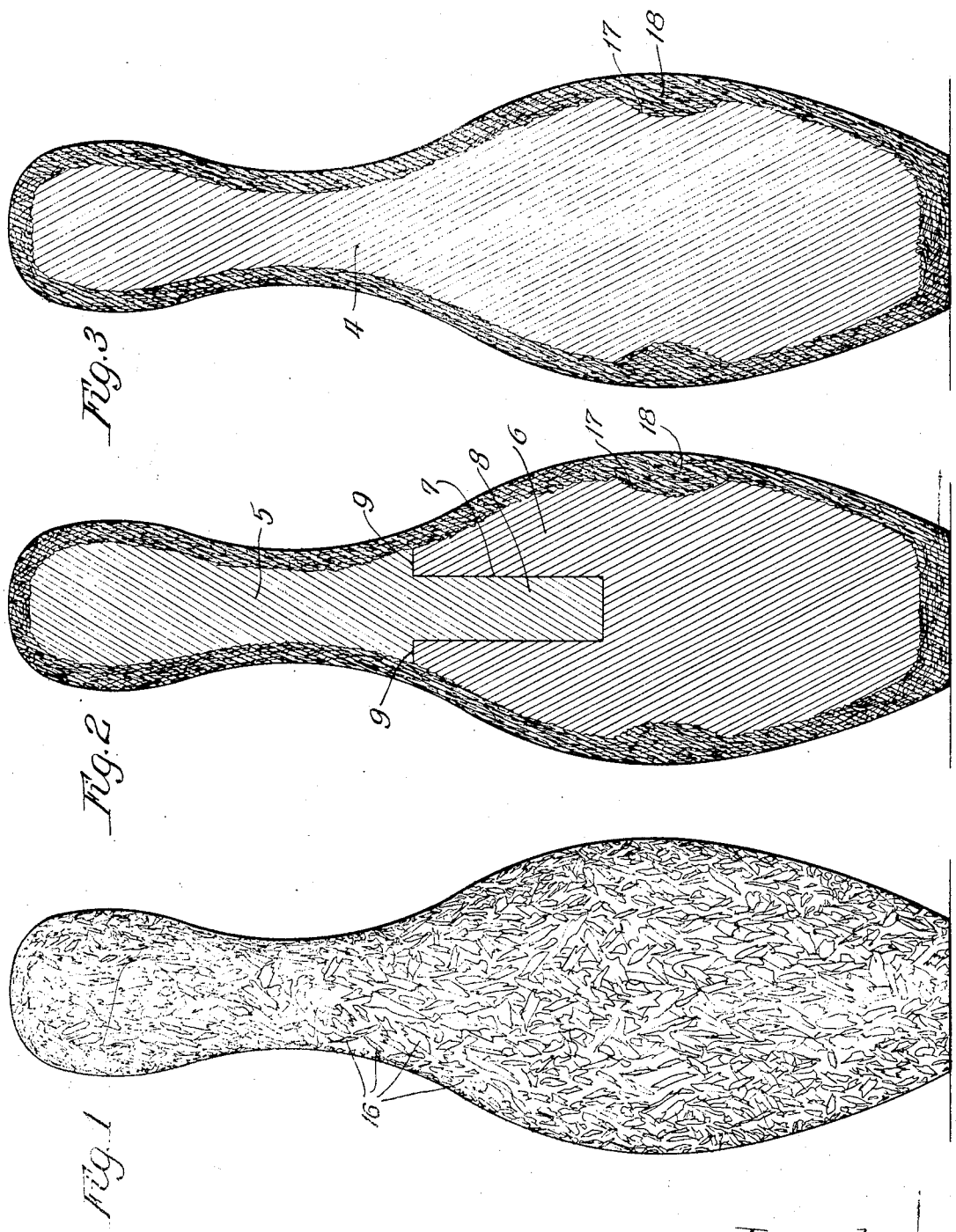

March 8, 1927. 1,620,310
M. J. WHELAN
BOWLING PIN
Filed March 27, 1922    2 Sheets-Sheet 2
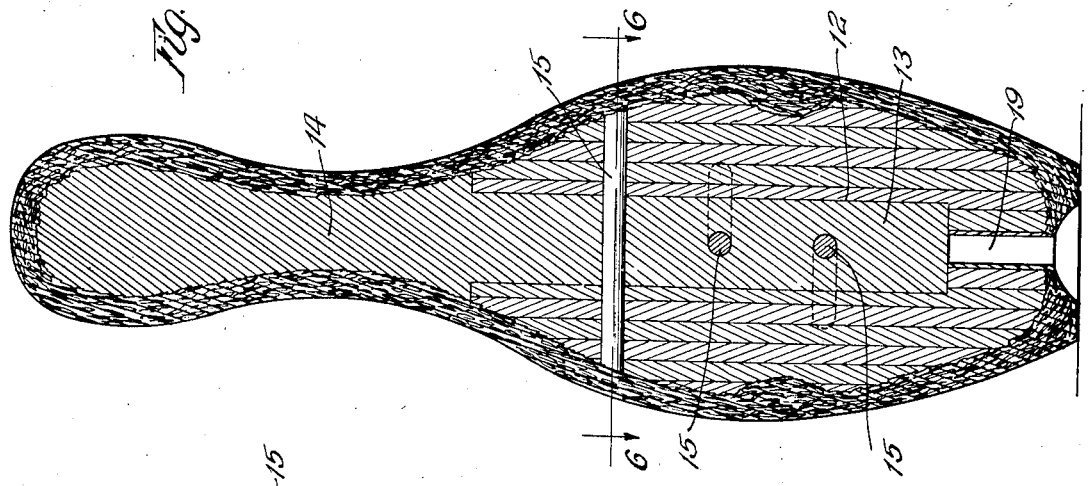
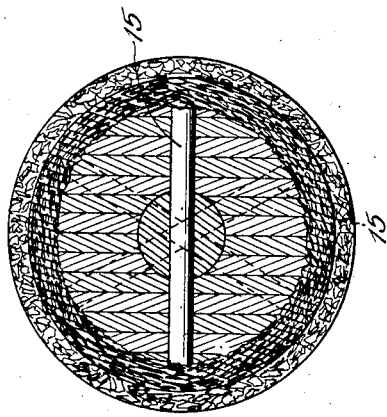
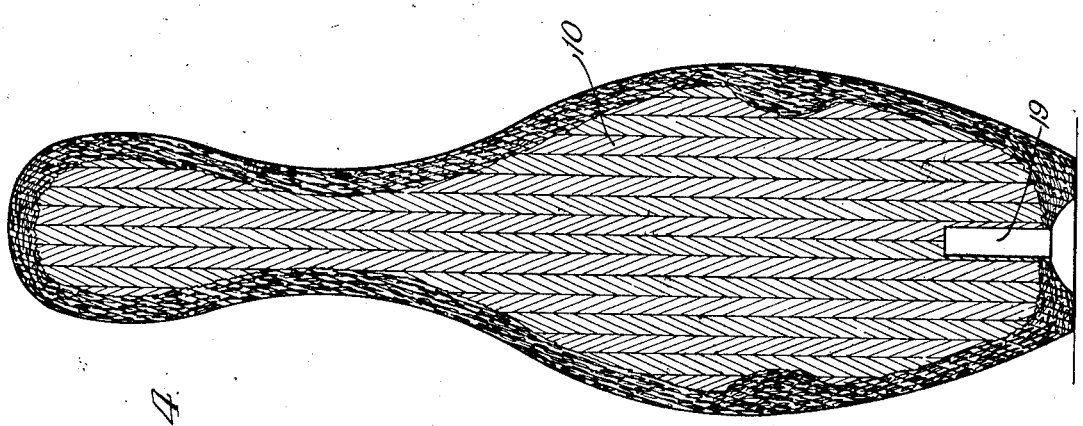
Inventor:
Michael J. Whelan
By: Wm O Bell
Atty.

Patented Mar. 8, 1927.

1,620,310

UNITED STATES PATENT OFFICE.

MICHAEL J. WHELAN, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

BOWLING PIN.

Application filed March 27, 1922. Serial No. 546,965.

This invention comprises certain improvements on the bowling pins covered by my Patents No. 1,088,312 patented February 24, 1914, and No. 1,182,882 patented May 9, 1916.

The object of my invention is to provide a durable and substantial bowling pin which can be made to conform to standard regulations as to size, shape and weight, which will not crack, split or splinter in actual use, and which will give a good sound when struck by a bowling ball or by other pins.

Further objects of the invention are to provide a pin which can be made at comparatively low cost, which will have a smooth surface and an attractive appearance, which will not chip or wear off quickly at the base, which will not break easily at the neck, and which will be more satisfactory to players and give better service than all-wood pins.

I have done a large amount of work in the development of composite and composition bowling pins and in my Patent No. 1,088,312 I disclosed a bowling pin having a wood core covered with a sheathing of rubber composition vulcanized to the core. In my Patent No. 1,182,882 I disclosed a bowling pin consisting of a composition of hard, vulcanized rubber having a fibrous material such as wood shavings thoroughly incorporated therewith. In the course of my work and as the result of many experiments and tests which I have made and which have been made by others in connection with this work I have invented a new pin possessing important advantages over my patented pins aforesaid, over wood pins and over other pins of which I have knowledge, and in the accompanying drawing I have illustrated a selected embodiment of the invention in which—

Fig. 1 is an elevation of the pin embodying the invention;

Fig. 2 is a sectional view of a pin having a two-piece core;

Fig. 3 is also a sectional view but showing a one-piece core;

Fig. 4 is a sectional view showing a laminated one-piece core;

Fig. 5 is a sectional view showing a two-piece core comprising a laminated body portion;

Fig. 6 is a transverse sectional view on the line 6—6 of Fig. 5.

Referring to the drawings, the pin comprises a wood core having a covering composed of a plastic compound and small pieces of wood preferably in the form of sticks or splinters incorporated therewith, the covering being molded or otherwise formed upon the core and united therewith, producing a pin of a predetermined size, shape and weight. The solid one-piece core 4 (Fig. 3) of good strong wood may be used but I have found it very satisfactory to use a two-piece core (Fig. 2) comprising a head and neck 5 of hard wood, such as maple, and a body 6 of a soft wood. I prefer to provide the body 6 of the core with a bore 7 to receive a stem 8 extending downward from the neck, this stem being of less diameter than the neck where it joins the neck so that an annular shoulder 9 is formed on the neck to seat against the upper end of the body. I may make the one-piece core of laminated wood, as shown at 10 in Fig. 4, the laminations preferably having the grain crossed as usual in laminated wood; and I may make the two-piece core with a laminated body 11 provided with a bore 12 to receive the stem 13 of the solid neck 14, as shown in Fig. 5. The bore and stem may be short as shown in Fig. 2, or long as shown in Fig. 5 and one or more dowel pins 15 may be arranged transversely through the body and stem to securely hold the parts together.

The compound employed may be of any kind suitable for the purpose but I prefer a hard rubber compound, and the wood pieces 16 are thoroughly incorporated therewith so that in the finished article the wood pieces are distributed with a fair degree of uniformity throughout the surface of the pin and throughout the entire rubber covering. These wood pieces are preferably in the form of little sticks or splinters instead of the shavings described in my Patent No. 1,182,882. I have found by experience that straight shavings, and even curled shavings of relatively small size, will work satisfactory but that there are certain conditions under which curled shavings may fail to produce satisfactory results and defects may not become known until after the pin has gone into use. I have found in practice that a curled shaving will sometimes prevent the formation of a satisfactory covering for reasons which are difficult to determine with positiveness but which I believe to be because the curled shaving provides voids in the covering or has a tendency to distort the covering during the process of manufacture and prevent the formation of a sufficiently solid and homogeneous covering. I have also found that the use of substantially straight pieces of wood like little sticks and splinters produce entirely satisfactory results and I have also found that what are commonly described as shavings, if they are in small pieces and are not curled in a manner which is liable to produce the defects heretofore mentioned, can also be satisfactorily used. It is the purpose of this invention to employ a comparatively large amount of fibrous material as compared with the hard rubber compound and, in fact, I have achieved very satisfactory results with 85% by volume of fibrous material to 15% by volume of hard rubber compound.

I prefer to roughen the surface of the core by the use of a suitable tool or, at least, to provide a core with a roughened surface, so that the composition covering will readily adhere to the core and be thoroughly vulcanized thereto and united therewith. I may also recess the body of the core at 17 so that the covering will be thicker at 18 in the form of a band seated in the body of the core about midway between the top and bottom of the body of the core where the pin receives the hardest blows. A hole 19 may be provided in the bottom of the pin to receive the stud of pin setting machine.

It will readily be understood that the pin can be made in any size or shape desired and that the proper weight can be maintained by proportioning the covering and the core as may be desired so that the pins may be produced at all times in a uniform size, shape and weight. It is highly desirable in order to compete with the best quality of wood pins that a composite pin should give a good sound when the ball strikes or when one pin is struck by another. Some composite pins give off a dead sound because of their structure or because of their components and this is very unsatisfactory in actual use. But my pin rings very much like a good wood pin when struck and is highly pleasing to players for this reason. I have also demonstrated by actual test that a pin of this kind will stand hard usage, will last longer than good wood pins, will not crack, split or splinter and that the base will remain undamaged to an extent sufficient to enable the pin to be kept in actual use for a much longer time than ordinary good wood pins. A pin embodying my invention can be made at a relatively low cost and from long experience and from the tests which I have conducted, or which have been conducted for me, I am convinced that this pin meets all the requirements of the bowling game and of players at the present time and that it has a much longer life under the ordinary playing conditions than good wood pins.

In the drawings I have shown my invention embodied in a selected form in ten pins but I desire to have it understood that the invention may be embodied in duck pins, candle pins and pins of any other shape and in such forms as are adapted for the purpose and as are included with the scope of the following claims.

I claim:

1. As a new article of manufacture, a bowling pin comprising a core and a composition covering on said core and securely united therewith and consisting of a plastic compound having small, fine and comparatively short pieces of wood in the form of little sticks or splinters thoroughly incorporated therewith.

2. As a new article of manufacture, a bowling pin having a contact portion normally engageable by a bowling ball, consisting of a plastic compound having pieces of wood thoroughly incorporated therewith substantially all of said pieces being short and straight.

3. As a new article of manufacture, a bowling pin comprising a wood core in the general form of a pin and consisting of a head and neck formed of comparatively hard wood, a body formed of comparatively soft wood, and a covering vulcanized on the surface of said core and consisting of a plastic compound having small pieces of wood thoroughly incorporated therewith.

4. As a new article of manufacture, a bowling pin having a contact portion engageable by a bowling ball, consisting of a hard rubber compound having pieces of wood uniformly distributed therethrough substantially all of said pieces being short and straight.

5. As a new article of manufacture, a bowling pin comprising a wood core made in the general form of a pin and having a hard wood head and neck and a soft wood body, the neck having a stem projecting therefrom and the body having a bore to receive the stem and the neck having shoulders at one end of the stem against which the upper end of the body abuts, and a composition covering vulcanized on the surface of said core and composed of a plastic compound and small pieces of wood thoroughly incorporated therewith.

6. As a new article of manufacture, a bowling pin having a wood core and a composition covering vulcanized on the surface of said core, said composition consisting of hard rubber compound and small, fine and comparatively short pieces of wood in the proportions of approximately 15% of compound and 85% of wood.

7. As a new article of manufacture, a bowling pin having a wood core comprising a plurality of relatively thin parallel laminations extending in the direction of the length of the pin, and a composition covering on said core.

8. As a new article of manufacture, a bowling pin having a wood core comprising a body having a plurality of laminations extending in the direction of the length of the pin and also having a bore therein, a head and neck having a stem projecting from the neck to engage the bore in the body, a dowel pin extending transversely through the stem and body, and a composition covering vulcanized on the surface of said core.

9. As a new article of manufacture, a bowling pin having a wood core comprising a body having a plurality of laminations extending in the direction of the length of the pin and also having a bore therein, a head and neck made of a solid piece of wood and having a stem projecting from the neck to engage said bore, and a composition covering vulcanized on the surface of said core and composed of a plastic compound and small pieces of wood thoroughly incorporated therewith.

10. As a new article of manufacture, a bowling pin comprising a core having a roughened surface and a composition on said core and securely united therewith and consisting of a plastic compound having small, fine and comparatively short pieces of wood in the form of little sticks or splinters thoroughly incorporated therewith.

11. As a new article of manufacture, a bowling pin comprising a wood core having a roughened surface and a composition covering vulcanized on said core and consisting of a hard rubber compound having small, fine and comparatively short pieces of wood in the form of little sticks or splinters thoroughly incorporated therewith.

12. As a new article of manufacture, a bowling pin comprising a wood core in the general form of a pin having a roughened surface and consisting of a head and neck formed of comparatively hard wood, a body formed of comparatively soft wood, and a covering vulcanized on the surface of said core and consisting of a plastic compound having small pieces of wood thoroughly incorporated therewith.

13. As a new article of manufacture, a bowling pin having a contact portion engageable by a bowling ball, consisting of a plastic compound composed of a hard rubber and small, short and straight pieces of wood in approximately the proportions of 15% of the rubber and 85% of the wood.

MICHAEL J. WHELAN.